United States Patent [19]

Seibert

[11] Patent Number: 5,558,026
[45] Date of Patent: Sep. 24, 1996

[54] MOTOR VEHICLE TRAY

[76] Inventor: David S. Seibert, 481 Cushing St., Hingham, Mass. 02043

[21] Appl. No.: 304,258

[22] Filed: Sep. 12, 1994

Related U.S. Application Data

[63] Continuation-in-part of Ser. No. 127,042, Sep. 26, 1993, abandoned.

[51] Int. Cl.⁶ .................................................. A47B 37/00
[52] U.S. Cl. ..................... 108/44; 224/276; 248/205.2
[58] Field of Search ................................. 224/276, 270, 224/906, 275; 108/44, 43, 149; 297/163; 248/447.2, 205.2

[56] References Cited

U.S. PATENT DOCUMENTS 2,211,962   8/1940   Morris .
3,031,162   4/1962   Whorton .
3,139,255   6/1964   Palm .
3,643,606   2/1972   Vise .
4,466,659   8/1984   Carpentier et al. ..................... 224/275
4,749,161   6/1988   Falcone .
4,979,657   12/1990  Espirita .
5,060,581   10/1991  Malinski .

FOREIGN PATENT DOCUMENTS 2144627   3/1985   United Kingdom .

Primary Examiner—Linda J. Sholl
Attorney, Agent, or Firm—Selitto & Associates

[57] ABSTRACT

A motor vehicle tray adapted for mounting on a steering wheel of a motor vehicle includes a support panel for supporting an article thereon and a main body panel connected to the support panel for suspending the support panel outwardly from the steering wheel at an angle relative thereto. Side panels, which extend outwardly from the main body panel, are releasably attached to the support panel in such a manner as to permit the angle between the support panel and the steering wheel to be adjustable.

5 Claims, 2 Drawing Sheets

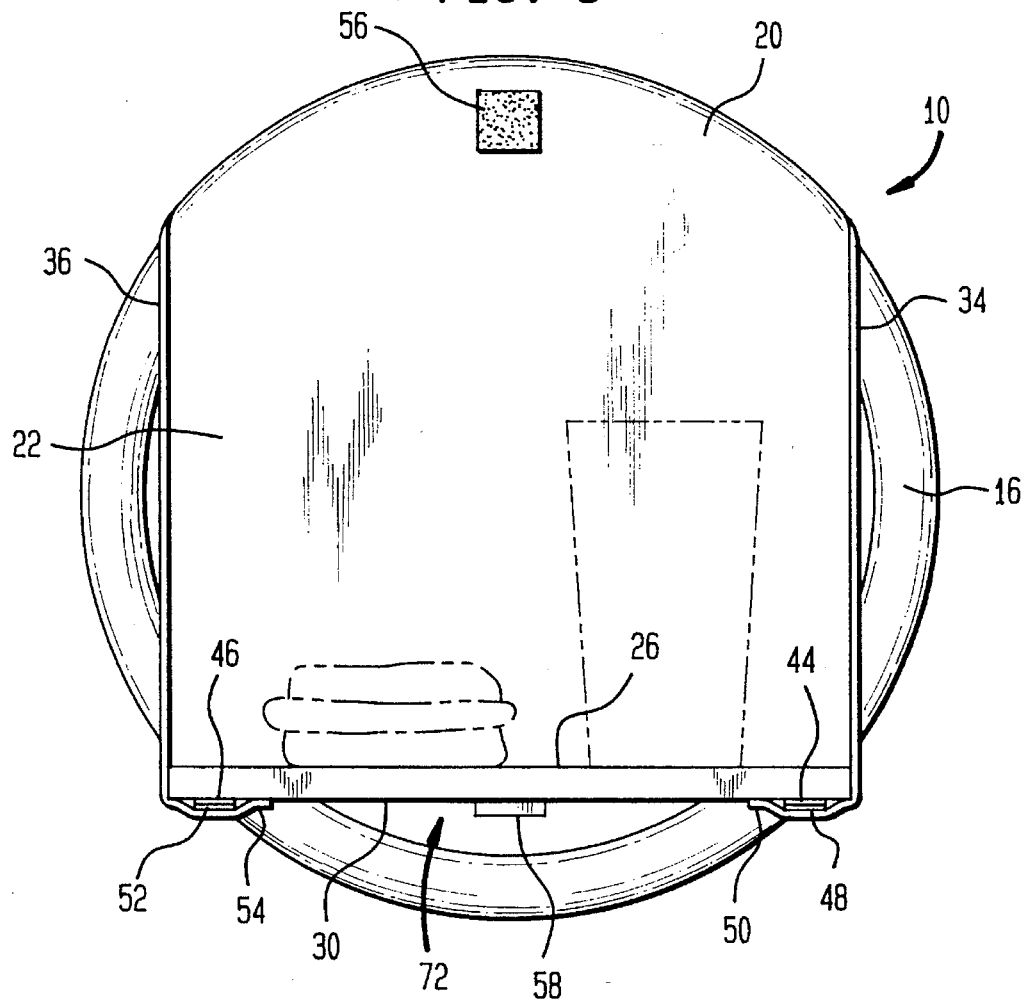

MOTOR VEHICLE TRAY

CROSS REFERENCE TO RELATED APPLICATION

This is a continuation-in-part of application Ser. No. 08/127,042 filed Sep. 26, 1993 now abandoned.

FIELD OF THE INVENTION

The present invention relates to trays and, more particularly, to a portable, foldable tray for use in a motor vehicle.

BACKGROUND OF INVENTION

With the advent of drive-through restaurants, many people consume beverages and foods while sitting behind a steering wheel of a parked motor vehicle. A tray adapted for mounting from a steeling wheel can provide a convenient holder for beverages and foods. Such a tray, for convenience, needs to be easily adaptable to different types of steering wheels, such as steering wheels having different sizes, shapes, and angles of inclination. Further, it needs to be easily storable in a small place within a motor vehicle, such as a glove compartment or a storage compartment under a seat.

Various trays which can be mounted upon a steering wheel have been developed. For instance, U.S. Pat. No. 3,643,606 discloses a car tray having a pair of table sections, joined together via spring loaded hinges. The table sections are foldable toward and away from each other into a plurality of positions in which they are arrestable via the hinges. Although the tray provides adjustability of a tray top with respect to steering wheel inclination, the construction of the tray is complicated by the utilization of the hinges. Further, the tray is bulky, making the car tray difficult to store in a car.

U.S. Pat. No. 5,060,581 discloses to a steering wheel tray which can be pivotally mounted on a steering wheel. The tray is suspended from a back panel by straps. The inclination of the tray relative to the steering wheel is adjusted by changing the length of the straps; an operation which requires the straps to be bunched together and brass brads to be inserted through slits in the straps. Since there is a finite number of slits, the adjustment capability is limited to set positions. Further, the adjustability of the inclination of the tray is time-consuming because of the need to bunch the straps and then insert the brads therethrough.

U.S. Pat. No. 2,211,962 discloses a serving tray having a body, an U-shaped bail hingedly attached at opposite ends thereof to the body, and a pair of upright braces on the body. The braces include notched marginal portions for releasable interlocking engagement with legs of the bail such that the body and the bail are adjustable relative to each other. Because the braces are not retractable and the bail is relatively large, the tray cannot be conveniently stored in an automobile.

SUMMARY OF THE INVENTION

The present invention overcomes the disadvantages and shortcomings of the prior art discussed above by providing a new and improved motor vehicle tray having adjustability and, hence, the ability to be mounted from different types of steering wheels, such as steering wheels having different sizes, shapes, and angles of inclination. More particularly, the present invention relates to a motor vehicle tray which includes a support panel for supporting an article thereon and a main body panel connected to the support panel for suspending the support panel outwardly from the steering wheel at an angle relative thereto. Side panels, which extend outwardly from the main body panel, are provided with means for adjusting the angle between the support panel and the steering wheel.

Another feature of the present invention involves constructing the motor vehicle tray from a body which is constructed from an unitary blank. Such a construction permits the tray to be folded into a compact unit for easy storage in, for instance, a glove compartment of a motor vehicle.

BRIEF DESCRIPTION OF THE DRAWINGS

For a better understanding of the present invention, reference is made to the following description of an exemplary embodiment of the invention considered in conjunction with the accompanying drawings in which:

FIG. 3 is a front elevational view of the tray shown in FIG. 1.

DETAILED DESCRIPTION OF THE EXEMPLARY EMBODIMENT

Figure 1:
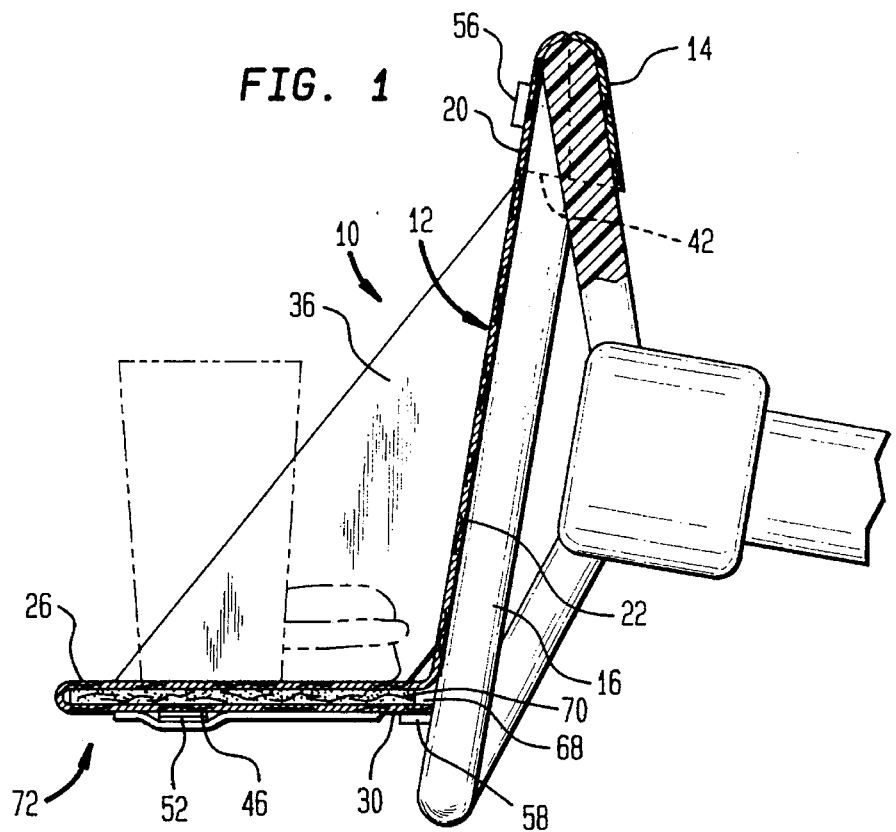
FIG. 1 is a cross-sectional side elevational view of a motor vehicle tray constructed in accordance with the present invention, the tray being mounted upon a steering wheel of a vehicle.

Referring to FIG. 1, a motor vehicle tray 10 includes a body 12 and a back panel 14. The tray 10 is adapted to be mounted to a steering wheel 16 of a motor vehicle.

Figure 2:
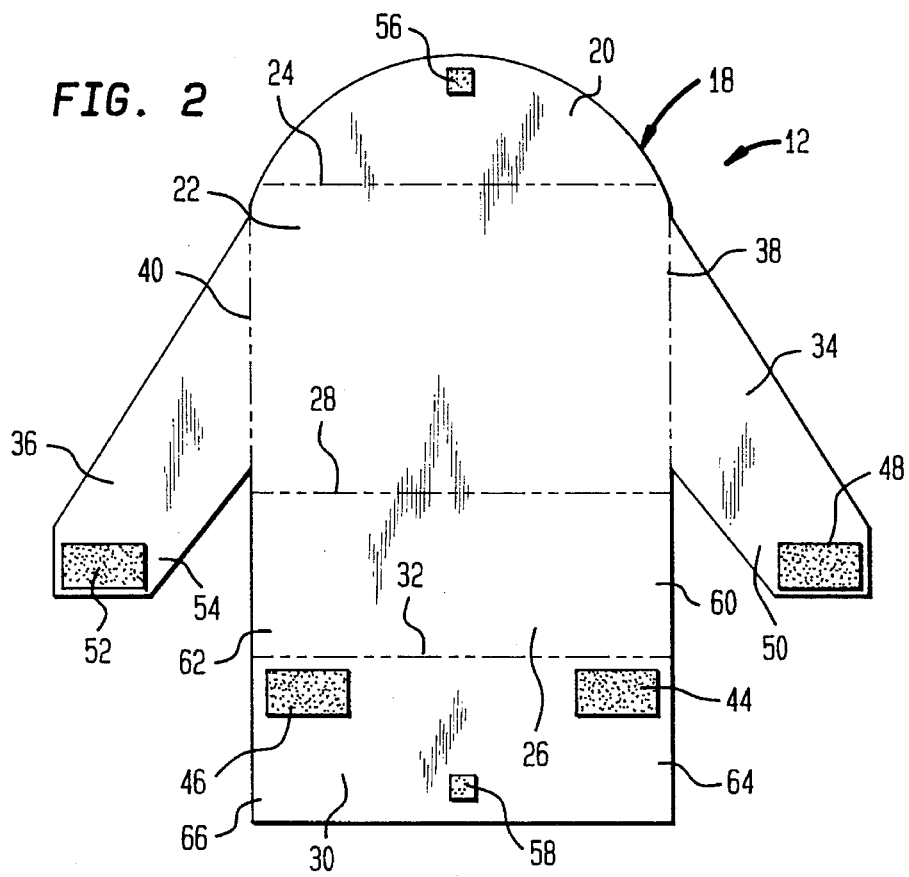
FIG. 2 is a top plan view of an unitary blank for constructing a body of the tray shown in FIG. 1.

Referring primarily to FIG. 2, the body 12 is constructed from an unitary blank 18 which may be die cut from a sheet of vinyl, canvas, plastic, leather or other synthetic or natural materials. The blank 18 has a front surface (which is visible in FIG. 2) and a rear surface (which is not visible in FIG. 2). The blank 18 also includes an upper panel 20 which is substantially semicircular in shape. A main body panel 22 is located downwardly from the upper panel 20 and is delimited therefrom by an imaginary fold line 24. An intermediate panel 26 is located downwardly from the main body panel 22 and is delimited therefrom by an imaginary fold line 28. A lower panel 30 is located downwardly from the intermediate panel 26 and is delimited therefrom by an imaginary fold line 32. The blank 18 also includes a pair of side panels 34, 36 which extend outwardly and downwardly from the main body panel 22. The side panels 34, 36 are delimited from the main body panel 22 by imaginary fold lines 38, 40, respectively. The main body panel 22, the intermediate panel 26, and the lower panel 30 are rectangular in shape, all having substantially the same lateral dimension.

The back panel 14, which corresponds to the upper panel 20 in shape, is connected to the upper panel 20 on the rear side of the blank 18. More particularly, the upper panel 20 and the back panel 14 are stitched together along their adjoining arcuate edges, thereby forming an inverted pocket 42 for purposes to be discussed hereinafter. It should be noted that the upper panel 20 and the back panel 14 may be attached together by other conventional means, such as heat bonding.

Referring to FIGS. 2 and 3, the body 12 includes loop and hook fasteners 44, 46 such as the fastener commonly sold under the trademark "Velcro", attached to upper corners of the lower panel 30 on the front side of the blank 18. A complimentary loop and hook fastener 48, such as the fastener commonly sold under the trademark "Velcro", which can be removably attached to the fastener 44 of the lower panel 30, is attached to a free end 50 of the side panel 34 and is positioned on the front side of the blank 18 for purposes to be discussed hereinafter. Likewise, a complimentary loop and hook fastener 52, such as the fastener commonly sold under the trademark "Velcro", which can be removably attached to the loop and hook fastener 46 of the lower panel 30, is attached to a free end 54 of the side panel 36 and is positioned on the front side of the blank 18 for purposes to be discussed hereinafter. Alternatively, other conventional fasteners may be employed in lieu of the fasteners 44, 46, 48, 52.

The body 12 also includes a loop and hook fastener 56, such as the fastener commonly sold under the trademark "Velcro", attached to the upper panel 20 on the front side of the blank 18 and a complimentary lopp and hook fastener 58 such as the fastener commonly sold under the trademark "Velcro", attached to the lower panel 30 on the front side of the blank 18. The fastener 56 of the upper panel 20 can be removably attached to the fastener 58 of the lower panel 30 for a purpose to be discussed hereinafter. Alternatively, other conventional fasteners may be employed in lieu of the fasteners 56, 58.

With reference to FIGS. 1 and 2, to fabricate the body 12 of the tray 10 from the blank 18, the lower panel 30 of the blank 18 is folded backwards along the fold line 32 such that a rear side (which is not visible in FIG. 2) of the lower panel 30 extends over a rear side (which is not visible in FIG. 2) of the intermediate panel 26. Opposing side edges 60, 62 of the intermediate panel 26 are stitched to opposing side edges 64, 66, respectively, of the lower panel 30 such that a pocket 68 is formed between the intermediate panel 26 and the lower panel 30, the pocket 68 being shaped and sized to receive an insert 70 which is preferably made from a substantially rigid material. Alternatively, the opposing side edges 60, 62 of the intermediate panel 26 can be attached to the opposing side edges 64, 66, respectively, of the lower panel 30 by other conventional means, such as heat bonding. The intermediate panel 26, the lower panel 30 and the insert 70 cooperate to form a tray top 72 when the tray 10 is mounted on the steering wheel 16.

Referring to FIGS. 1 and 3, to use the tray 10 in a motor vehicle, the tray 10 is mounted upon the steering wheel 16. More particularly, an upper portion of the steering wheel 16 is securely inserted into the inverted pocket 42, suspending the tray 10 from the steering wheel 16. With the insert 70 being positioned within the pocket 68 and the main body panel 22 being supported against the steering wheel 16, the tray top 72 is folded along the fold line 28 such that the tray top 72 extends outwardly from the steering wheel 16 and assumes a substantially horizontal orientation in which an obtuse angle is formed between the tray top 72 and the steering wheel 16 or the main body panel 22. When the tray top 72 is so oriented, the intermediate panel 26 faces upward to define an upper surface of the tray top 72 and the lower panel 30 faces downward to define a lower surface of the tray top 72. With the side panels 34, 36 being folded along the fold lines 38, 40, respectively, the ends 50, 54 of the side panels 34, 36, respectively, are pulled underneath the lower panel 30. While maintaining the horizontal orientation of the tray top 72, the fasteners 48, 52 of the side panels 34, 36, respectively, are attached to the fasteners 44, 46, respectively, of the lower panel 30 such that the tray top 72 is securely suspended in its horizontal orientation by the side panels 34, 36, whereby beverage and/or food containers or the like can be placed on the upper surface of the tray top 72.

To store the tray 10, the tray 10 is removed from the steering wheel 16. With the Velcro fasteners 48, 52 of the side panels 34, 36, respectively, remaining attached to the fasteners 44, 46, respectively, of the lower panel 30, the side panels 34, 36 are folded along the fold lines 38, 40 onto the main body panel 22. The tray top 72 is also folded along the fold line 28 such that at least a portion of the intermediate panel 26 is positioned over the main body panel 22. Likewise, the upper panel 20 is folded along the fold line 24 such that at least a portion of the upper panel 20 is positioned over the main body panel 22. The fastener 56 of the upper panel 20 is then attached to the fastener 58 of the lower panel 30 so that the tray 10 is securely held in a compact folded state for easy storage in, for instance, a glove compartment of a motor vehicle. Alternatively, the side panels 34, 36 can be folded along the fold lines 38, 40 after the fasteners 48, 52 of the side panels 34, 36, respectively, are detached from the fasteners 44, 46, respectively, of the lower panel 30. It should be noted, however, that once the angular inclination of the tray top 72 relative to the steering wheel 16 and hence the main body panel 22 is adjusted as required in order to maintain the horizontal orientation of the tray top 72, it is more convenient to fold the side panels 34, 36 along the fold lines 38, 40, respectively, with the fasteners 48, 52 of the side panels 34, 36, respectively, being left attached to the fasteners 44, 46, respectively, of the lower panel 30 so that it is not necessary to re-adjust the angular inclination of the tray top 72 for a subsequent use.

It should be appreciated that the tray 10 provides a convenient place for holding beverage and/or food containers or the like. Because the angle of the tray top 72 relative to a steering wheel 16 can be adjusted by simply moving the attachment points between the fasteners 44, 48, on the one hand, and the fasteners 46, 52, on the other hand, the tray 10 can be quickly and easily adapted to different types of steering wheels or to steering wheels having different inclinations relative to the horizontal. In addition, the tray 10 has a simple construction, thereby making it easy and efficient to manufacture and use. It should also be appreciated that the side panels 34, 36 not only provide support for the tray top 72, but also facilitate in preventing materials placed on the tray top 72 from falling off.

It will be understood that the embodiment described herein is merely exemplary and that a person skilled in the art may make many variations and modifications without departing from the spirit and scope of the invention. For example, the tray 10 can be adapted to be removably attached to other parts of a motor vehicle, such as a windshield or a dashboard. In addition, the fold lines 24, 28, 32, 38, 40 can be visible instead of imaginary. Further, the lower panel 30 and the insert 70 may be omitted. All such modifications and variations are intended to be included within the scope of the invention as defined in the appended claims.

I claim:

1. A tray adapted for mounting on a steering wheel of a motor vehicle, comprising supporting means for supporting an article thereon; suspending means, which includes a first panel, for suspending said supporting means outwardly from the steering wheel at an angle relative thereto, said supporting means including a second panel connected to a first end of said first panel; mounting means for mounting said suspending means from the steering wheel, said mounting means including a third panel, which is connected to a second end of said first panel, said second end being positioned opposite said first end of said first panel, and a fourth panel, which is connected said third panel, said third panel and said fourth panel forming a first pocket therebetween, said first pocket being inverted and being shaped and sized so as to receive an upper portion of the steering wheel; and adjusting means for adjusting the angle between said supporting means and the steering wheel to one of a plurality of positions, said adjusting means including a pair of side panels, said side panels being connected to said first panel and extending outwardly from opposite sides of said first panel, and attaching means for removably attaching said side panels to said second panel such that the angle between said second panel and the steering wheel is adjustable to one of said plurality of positions, said attaching means including a first set of fasteners positioned on said side panels and a second set of fasteners positioned on said second panel, said first set of fasteners including a first fastener, which is positioned on a free end of one of said side panels, and a second fastener, which is positioned on a free end of the other of said side panels, said second set of fasteners including a third fastener, which is positioned adjacent to a first edge of said second panel, and a fourth fastener, which is positioned adjacent to a second edge of said second panel, said first panel, said second panel, said third panel and said side panels forming a body which is made from an unitary blank of a flexible material and which is foldable into a compact folded state for storage, said second panel being divided into a first subpanel, which is connected to said first panel and which has a pair of opposing edges, and a second subpanel, which is connected to said first subpanel and which has a pair of opposing edges, said second subpanel being folded onto said first subpanel along a first fold line extending between said first subpanel and said second subpanel, and said opposing edges of said first subpanel being connected to said opposing edges of said second subpanel to form a second pocket.

2. The tray of claim 1, further comprising retaining means for retaining said body in its said folded state.

3. The tray of claim 1, wherein said second panel is foldable onto said first panel along a second fold line extending between said first panel and said second panel, said third panel is foldable onto said first panel along a third fold line extending between said first panel and said third panel, said one of said side panels is foldable onto said first panel along a fourth fold line extending between said first panel and said one of said side panels, and said other of said side panels is foldable onto said first panel along a fifth fold line extending between said first panel and said other of said side panels.

4. The tray of claim 1, further comprising an insert positioned within said second pocket.

5. The tray of Claim 4, wherein said insert is made from a substantially rigid material.

* * * * *